United States Patent
Wang et al.

(10) Patent No.: US 12,118,740 B2
(45) Date of Patent: Oct. 15, 2024

(54) METHOD AND DEVICE FOR DETECTING PROPELLERS WITH HIGH-PRECISION

(71) Applicant: QINGDAO POLARIS INTELLIGENT MANUFACTURING CO., LTD., Qingdao (CN)

(72) Inventors: Yongshun Wang, Qingdao (CN); Zhidong Fu, Qingdao (CN); Gongtao Xu, Qingdao (CN)

(73) Assignee: QINGDAO POLARIS INTELLIGENT MANUFACTURING CO., LTD., Qingdao (CN)

( * ) Notice: Subject to any disclaimer, the term of this patent is extended or adjusted under 35 U.S.C. 154(b) by 70 days.

(21) Appl. No.: 18/105,364

(22) Filed: Feb. 3, 2023

(65) Prior Publication Data

US 2024/0202952 A1 Jun. 20, 2024

(30) Foreign Application Priority Data

Dec. 19, 2022 (CN) .......................... 202211630928.9

(51) Int. Cl.
*G06T 7/60* (2017.01)
*G06T 3/60* (2024.01)
*G06T 7/10* (2017.01)

(52) U.S. Cl.
CPC .................. *G06T 7/60* (2013.01); *G06T 3/60* (2013.01); *G06T 7/10* (2017.01); *G06T 2207/10028* (2013.01); *G06T 2207/20021* (2013.01)

(58) Field of Classification Search
CPC ............................................ G06T 2207/10028
See application file for complete search history.

(56) References Cited

FOREIGN PATENT DOCUMENTS

| CN | 112508895 A | * | 3/2021 | ............ G06T 7/001 |
|---|---|---|---|---|
| CN | 114332173 A | * | 4/2022 | |

* cited by examiner

*Primary Examiner* — Jayanti K Patel
*Assistant Examiner* — Christopher Kingsbury Glover
(74) *Attorney, Agent, or Firm* — Birchwood IP

(57) ABSTRACT

A method and device for detecting propellers with high-precision are provided, the method includes obtaining a measurement point cloud of the propeller, filtering the measurement point cloud to obtain a target point cloud; processing the target point cloud to obtain a first measurement plane, and finding a center point of a pressure cone point cloud; obtaining a measuring axis according to the first measurement plane and the center point; segmenting the target point cloud to obtain a blade point cloud of each blade, and analyzing the blade point cloud and the measuring axis to obtain the parameters of the propeller, so as to determine whether the propeller is qualified. A high-precision structured light 3D camera is used, simple and high-precision detection solution for propeller products is developed based on the open-source 3D algorithm framework PCL. The device can improve the detection efficiency and the feasibility of promotion.

10 Claims, 5 Drawing Sheets

METHOD AND DEVICE FOR DETECTING PROPELLERS WITH HIGH-PRECISION

CROSS-REFERENCE TO RELATED APPLICATIONS

This application claims the benefit and priority of Chinese patent application No. 202211630928.9, filed on Dec. 19, 2022, disclosure of which is hereby incorporated by reference in its entirety.

TECHNICAL FIELD

The present application relates to the field of propeller detection, in particular to a method and device for detecting propellers with high-precision.

BACKGROUND

Propeller refers to a device that converts the rotational power of the engine into propulsion by rotating the blades in the air or water. It can be connected with the hub by two or more blades. The rear side of the blade is a helicoid or a propeller similar to a helicoid. There are many types of propellers, and they are widely used, such as propellers for airplanes and ships. The blade is the core of the propeller power, and the manufacturing quality of the propeller blade directly affects the performance and life of the propeller. The high-precision detection of blades is not only the basis for judging whether the blades are qualified, but also an important part of quality control in the processing process.

The traditional propeller detection methods mainly include: 1) manual measurement with calipers; 2) contact measurement with a three-coordinate measuring machine. There are obvious shortcomings in the use of these two methods. The results of manual measurement will be deviated due to the use of tools such as calipers, and it is time-consuming and labor-intensive. The three-coordinate measuring machine is expensive and the equipment is cumbersome, and it requires high space.

In view of this, it is an urgent problem to be solved in this technical field to overcome the shortcomings of existing products in the prior art.

SUMMARY

The technical problem mainly solved by this application is to provide a method and device for detecting propellers with high precision, which uses a high-precision structured light 3D camera and a convenient portable, simple and high-precision detection solution for propeller products developed based on the open source 3D algorithm framework PCL. The device can improve the detection efficiency and the feasibility of promotion.

In order to solve the above technical problems, a technical solution adopted by the application is: A method for detecting propellers with high-precision, comprising:
  obtain a measurement point cloud of the propeller, and filter the measurement point cloud to obtain a target point cloud;
  process the target point cloud to obtain a first measurement plane, and find a center point of a pressure cone point cloud;
  obtain a measuring axis according to the first measurement plane and the center point;
  segment the target point cloud to obtain the blade point cloud of each blade, and analyze the blade point cloud and measuring axis to obtain parameters of the propeller, so as to determine whether the propeller is qualified.

Further, obtain the measurement point cloud of the propeller, and filter the measurement point cloud to obtain the target point cloud comprises:
  detect the propeller by means of a structured light 3D camera and obtain the measurement point cloud of the propeller;
  filter the measurement point cloud to remove stray point cloud in order to obtain the target point cloud.

Further, process the target point cloud to obtain the first measurement plane comprises:
  Step A: randomly select three non-collinear points from the target point cloud, and determine a plane through the three points;
  Step B: find inliers from the target point cloud, wherein take the points whose distance to the plane is less than a preset distance as inliers;
  Step C: update the three points selected in step A, re-determine a plane, and perform step B to obtain inliers of the updated plane;
  iteratively process the step C, after a preset number of iterations, select the plane with the most inliers as the first measurement plane.

Further, obtain the measuring axis according to the first measurement plane and the central point comprises:
  obtain a linear equation of the measuring axis according to the center point of the pressure cone point cloud and a normal vector of the first measurement plane;
  transform a symmetric linear equation of the measuring axis into an intersection linear equation of the measuring axis to obtain the measuring axis.

Further, segment the target point cloud to obtain the blade point cloud of each blade, and analyze the blade point cloud and measuring axis to obtain parameters of the propeller, so as to determine whether the propeller is qualified, comprises:
  segment the target point cloud to obtain the blade point cloud of each blade;
  calculate the distance value of each blade point cloud from the measuring axis, and add the blade point cloud whose distance value satisfies a specific distance to a point set P;
  calculate point P_max farthest from the first measurement plane in the point set P;
  take the distance from the point P_max to the first measurement plane as the blade height, and calculate the full pitch of the propeller according to the full pitch measurement formula to determine whether the blade height and full pitch meet the requirements.

Further, segment the target point cloud to obtain the blade point cloud of each blade, and analyze the blade point cloud and measuring axis to obtain parameters of the propeller, so as to determine whether the propeller is qualified, further comprises:
  calculate point P_min closest to the first measurement plane in the point set P;
  calculate a second measurement plane formed by the point P_max and the measuring axis, and calculate a third measurement plane formed by the point P_min and the measuring axis;
  calculate a target angle between the second measurement plane and the third measurement plane;
  segment the second measurement plane according to a local equal fraction n and the target angle to obtain n equal division planes;

calculate a local pitch according to the point set P and each equal division plane.

Further, segment the second measurement plane according to a local equal fraction n and the target angle to obtain n equal division planes, comprises:
  rotate the second measurement plane around the measuring axis by 1/n times, 2/n times . . . (n−1)/n times of the target angle according to the local equal fraction n to obtain n equal division planes.

Further, calculate the local pitch according to the point set P and each equal division plane, comprises:
  calculate the intersection of the point set P and each equal division plane, and use the intersection as the input of the local pitch, and calculate the local pitch according to the pitch calculation method and the intersection to determine whether the local pitch meets the requirements.

Further, segment the target point cloud to obtain the blade point cloud of each blade, and analyze the blade point cloud and measuring axis to obtain parameters of the propeller, so as to determine whether the propeller is qualified, further comprises:
  find the flanging point P_invert, obtain a vertical height difference between the flanging point P_invert and the point P_max from the first measurement plane, and use the height difference as the flanging height to determine whether the flanging height meets the requirements.

In order to solve the above technical problems, another technical solution adopted by the present application is to provide a device for detection with high-precision, comprising:
  one or more processors;
  memory; and
    one or more application programs, wherein the one or more application programs are stored in the memory and configured to be executed by the processor to implement the method according to the present application.

The beneficial effect of this application is: the present application provides a method and device for detecting propellers with high-precision, comprising: obtain a measurement point cloud of the propeller, filter the measurement point cloud to obtain a target point cloud; process the target point cloud to obtain a first measurement plane, and find a center point of a pressure cone point cloud; obtain a measuring axis according to the first measurement plane and the center point; segment the target point cloud to obtain a blade point cloud of each blade, and analyze the blade point cloud and the measuring axis to obtain the parameters of the propeller, so as to determine whether the propeller is qualified. The present application uses a high-precision structured light 3D camera and a convenient portable, simple and high-precision detection solution for propeller products developed based on the open source 3D algorithm framework PCL. The device can improve the detection efficiency and the feasibility of promotion.

BRIEF DESCRIPTION OF DRAWINGS

In order to illustrate the technical solutions of the embodiments of the present application more clearly, the following briefly introduces the drawings that are used in the embodiments of the present application. Apparently, the drawings described below are only some embodiments of the present application, and those skilled in the art can also obtain other drawings according to these drawings without creative efforts.

DETAILED DESCRIPTION

Figure 1:
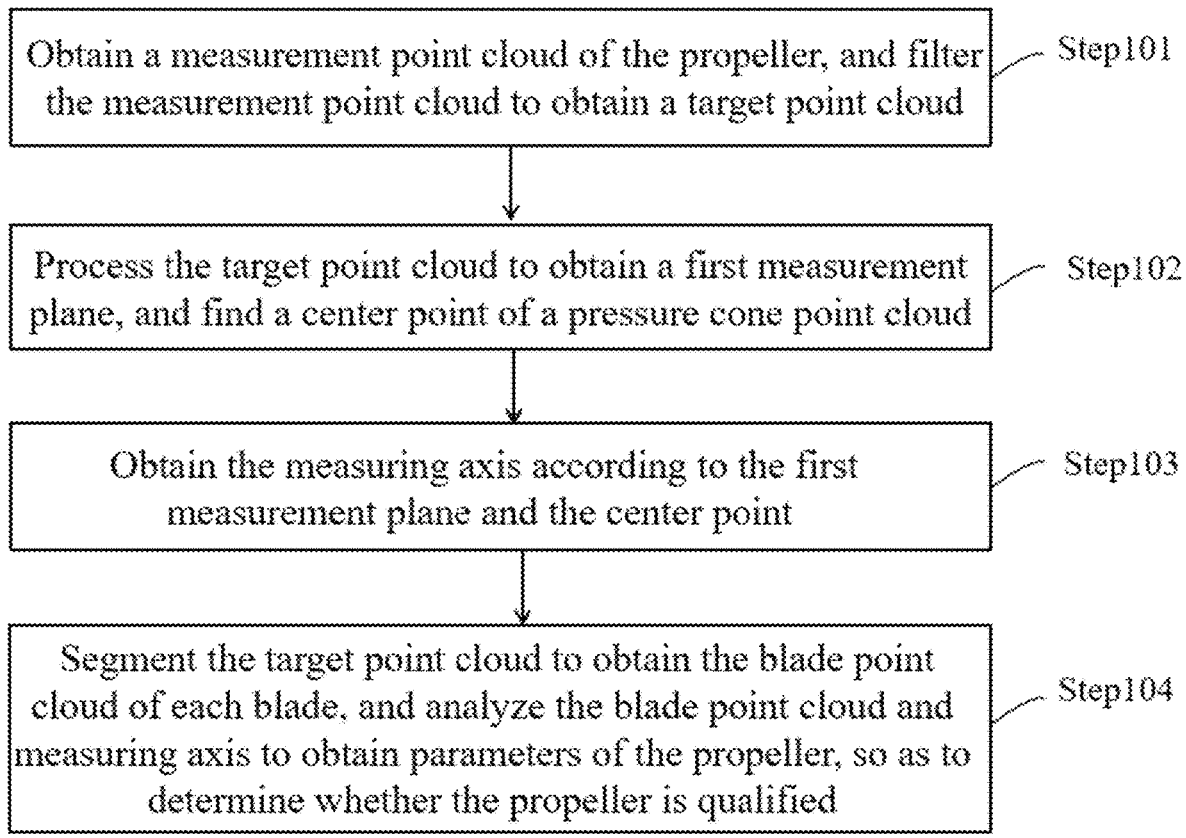
FIG. 1 is a schematic flow chart of a method for detecting propellers with high-precision provided by an embodiment of the present application.

The technical solutions in the embodiments of the present application will be clearly and completely described below in conjunction with the drawings in the embodiments of the present application. Apparently, the described embodiments are only some of the embodiments of this application, not all of them. Based on the embodiments in this application, all other embodiments obtained by those skilled in the art without making creative efforts belong to the scope of protection of this application.

In the description of the present application, it should be understood that the orientation or positional relationship indicated by the terms "center", "longitudinal", "transverse", "length", "width", "thickness", "upper", "lower", "front", "rear", "left", "right", "vertical", "horizontal", "top", "bottom", "inner", "outer", etc. is based on the orientation or positional relationship shown in the drawings, is only for the convenience of describing the present application and simplifying the description, but does not indicate or imply that the device or element referred to must have a specific orientation, be constructed and operated in a specific orientation, and therefore should not be construed as a limitation of the present application. In addition, the terms "first" and "second" are used for descriptive purposes only, and cannot be interpreted as indicating or implying relative importance or implicitly specifying the quantity of indicated technical features. Thus, features defined as "first" and "second" may explicitly or implicitly include one or more features. In the description of the present application, "plurality" means two or more, unless otherwise specifically defined.

In the present application, the word "exemplary" is used to mean "serving as an example or illustration". Any embodiment described in this application as "exemplary" is not necessarily to be construed as preferred or advantageous over other embodiments. The following description is given to enable any person skilled in the art to make and use the application. In the following description, details are set forth for purposes of explanation. It should be understood that one of ordinary skill in the art would recognize that the present application may be practiced without these specific details. In other examples, well-known structures and processes are not described in detail to avoid obscuring the description of the present application with unnecessary detail. Thus, the present application is not intended to be limited to the embodiments shown, but is to be accorded the widest scope consistent with the principles and features disclosed in the present application.

It should be noted that since the methods in the embodiments of the present application are executed in electronic devices, the processing objects of each electronic device exist in the form of data or information, such as time, which is essentially time information. It can be understood that if dimensions, quantities, positions, etc. are mentioned in the subsequent embodiments, there are corresponding data for processing by electronic devices, and details are not repeated here.

Embodiment 1

According to many years of research on the propeller industry, the current blades are more space torsion and complex cross-sectional shape. If the previous traditional cylindrical coordinate system measurement method is used, there will be many problems, mainly in the following three aspects:
  (1) Reliability issues. The head of the measuring rod used in the traditional method is a cone or a sphere. When measuring the blade, the following situations will occur, which will affect the reliability of the measurement: One is that the head interferes with the blade when it does not reach the specified measurement point; the other is that the head cannot measure the specified measurement point due to factors such as structure;
  (2) Accuracy issues. Because the pitch angle of the blade is relatively large, when the traditional measurement method is used to measure, the measuring rod is easy to shift on the surface of the blade, which seriously affects the measurement accuracy. There are also some scenarios that affect the accuracy even more because of the accompanying manual intervention.
  (3) High labor cost and Low efficiency. The traditional method is relatively dependent on manpower to realize the detection, and the measurement cycle is slow and the efficiency is low.

Figure 2A:
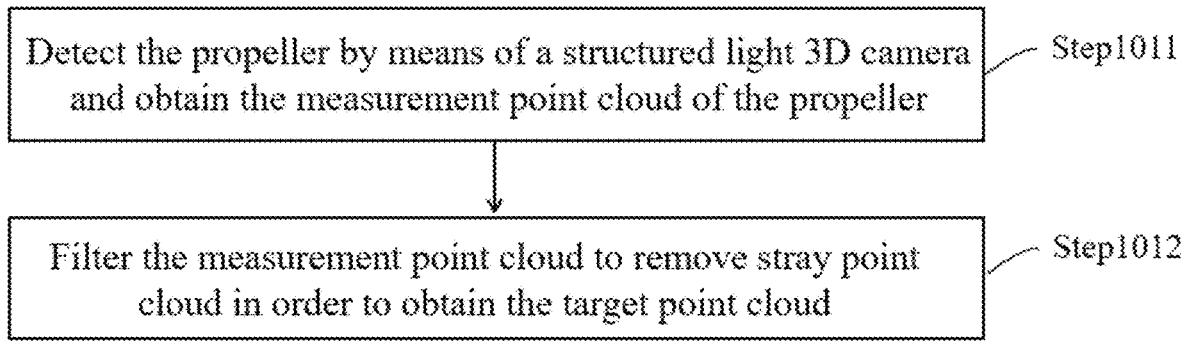
FIG. 2A is a schematic flow chart of step 101 in FIG. 1.

In order to solve the foregoing problems, this embodiment provides a method for detecting a propeller with high precision, by which the reliability and precision of the measurement can be improved, and the method is implemented in a time-saving and efficient manner. Referring to FIG. 1, the method comprises:
  Step 101: obtain a measurement point cloud of the propeller, and filter the measurement point cloud to obtain a target point cloud;
  Step 102: process the target point cloud to obtain a first measurement plane, and find a center point of a pressure cone point cloud;

In conjunction with FIG. 2A, step 101 specifically comprises step 1011: detect the propeller by means of a structured light 3D camera and obtain the measurement point cloud of the propeller; step 1012: filter the measurement point cloud to remove stray point cloud in order to obtain the target point cloud.

Figure 2B:
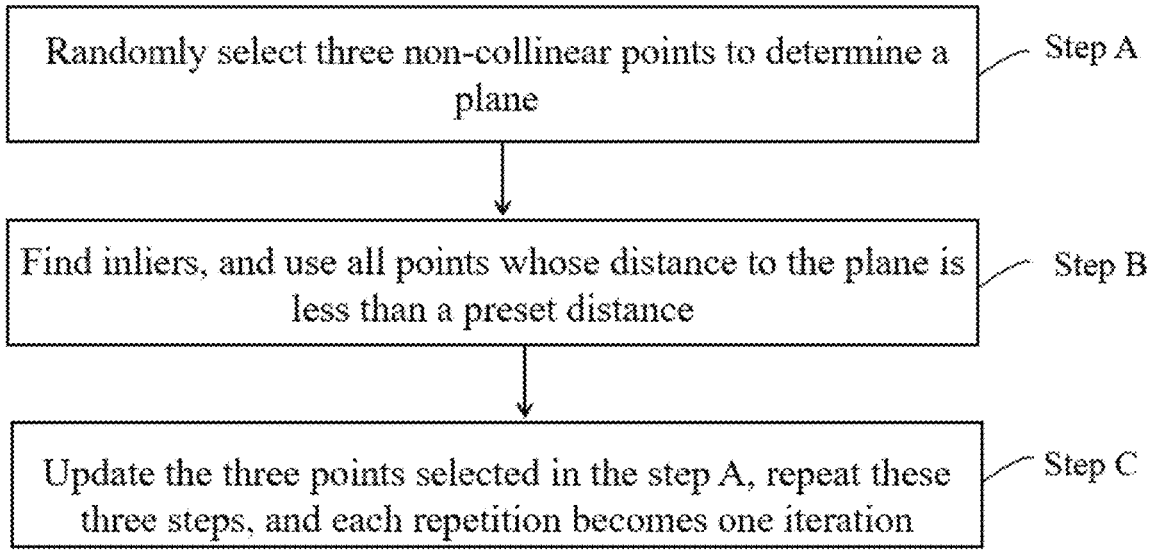
FIG. 2B is a schematic flow chart of step 102 in FIG. 1.

In conjunction with FIG. 2B, step 102 specifically comprises: Step A: randomly select three non-collinear points from the target point cloud, and determine a plane through the three points;
  Step B: find inliers from the target point cloud, wherein take the points whose distance to the plane is less than a preset distance as inliers;
  Step C: update the three points selected in step A, redetermine a plane, and perform step B to obtain inliers of the updated plane;
  iteratively process the step C, after a preset number of iterations, select the plane with the most inliers as the first measurement plane.

Specifically, the RANSAC method is used to fit the plane, and the specific principles are as follows:

Step A: Randomly select three non-collinear points (x1, y1, z1), (x2, y2, z2), (x3, y3, z3) to determine a plane $$\begin{vmatrix} x-x1 & y-y1 & z-z1 \\ x2-x1 & y2-y1 & z2-z1 \\ x3-x1 & y3-y1 & z2-z1 \end{vmatrix} = 0$$

Step B: Find inliers, and use all points whose distance to the plane is less than a preset distance, $d_{p\_p1}$ <certain threshold as inliers; wherein, the distance from the point to the plane is obtained according to the following formula $$d_{p\_p1} = \frac{Ax_0 + By_0 + Cz_0 + D}{\sqrt{(A^2+B^2+C^2)}}$$

Wherein the distance between two points is obtained according to the following formula:

$$d_{p\_p} = \sqrt{(x_2-x_1)^2+(y_2-y_1)^2+(z_2-z_1)^2}$$

Wherein $(x_1, y_1, z_1)$ and $(x_2, y_2, z_2)$ are the coordinates of two points respectively.

Step C: Update the three points selected in the step A, repeat these three steps, and each repetition becomes one iteration.

After n iterations, select the plane with the most inliers as the first measurement plane.

Find the center point of the pressure cone point cloud according to the following formula.

$$(x_c, y_c, z_c) = \left( \frac{\sum x_i}{n}, \frac{\sum y_i}{n}, \frac{\sum z_i}{n} \right)$$

Step 103: Obtain the measuring axis according to the first measurement plane and the center point;
In this embodiment, obtain a linear equation of the measuring axis according to the center point of the pressure cone point cloud and a normal vector of the first measurement plane; transform a symmetric linear equation of the measuring axis into an intersection linear equation of the measuring axis to obtain the measuring axis.

Obtain a linear equation of the measuring axis according to the center point of the pressure cone point cloud and a normal vector of the first measurement plane, $$\frac{x-x_1}{A} = \frac{y-y_1}{B} = \frac{z-z_1}{C},$$

and transform the measurement axis equation from the symmetric equation to an intersection equation.

Step 104: Segment the target point cloud to obtain the blade point cloud of each blade, and analyze the blade point cloud and measuring axis to obtain parameters of the propeller, so as to determine whether the propeller is qualified.

Figure 3:
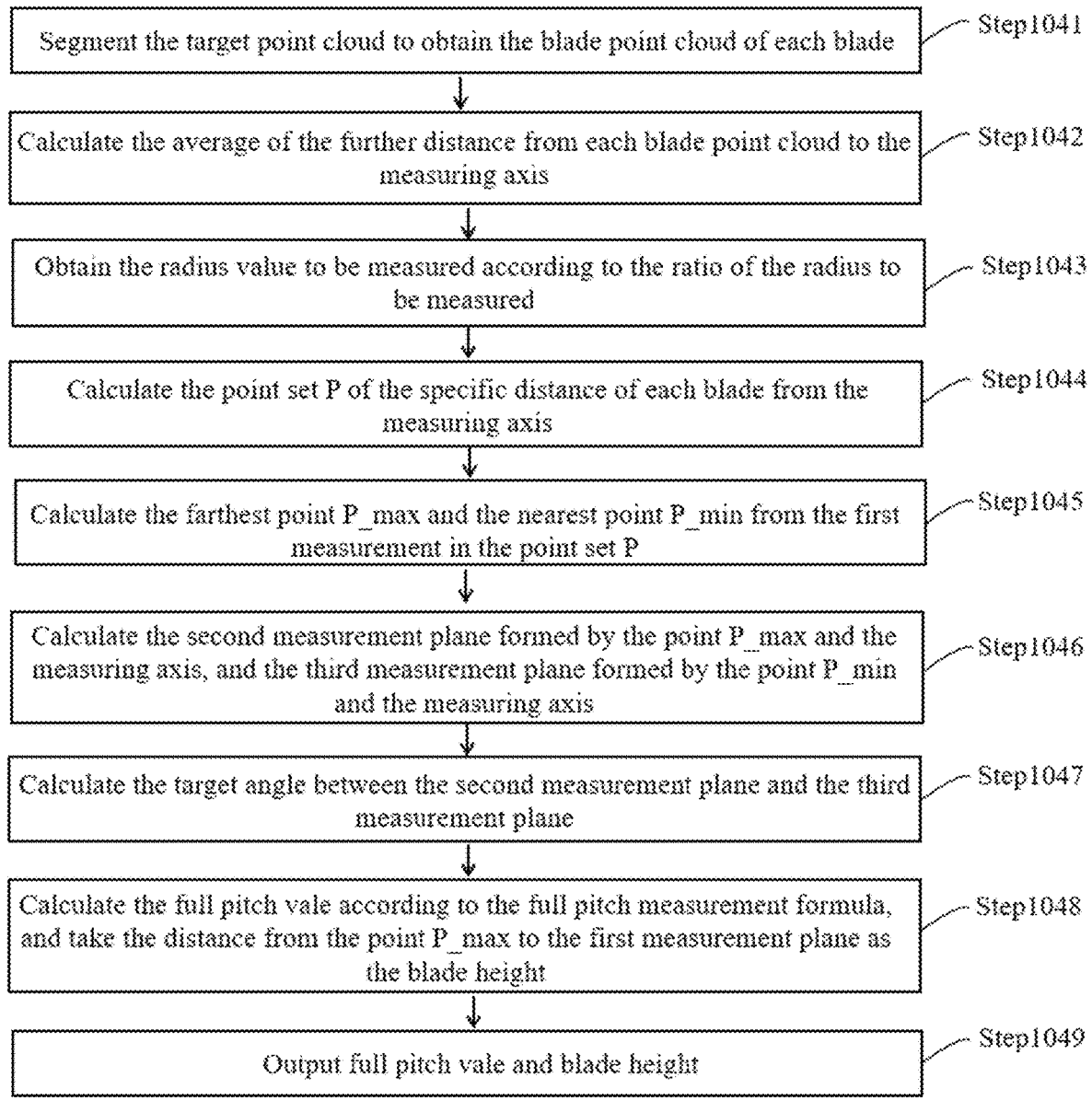
FIG. 3 is a schematic flow chart of another method for detecting propellers with high-precision provided by an embodiment of the present application.

In conjunction with FIG. 3, in this embodiment, step 104 includes: step 1041 segment the target point cloud to obtain the blade point cloud of each blade; step 1042: calculate the average of the further distance from each blade point cloud to the measuring axis, step 1043: obtain the radius value to be measured according to the ratio of the radius to be measured, step 1044: calculate the point set P of the specific distance of each blade from the measuring axis, step 1045: calculate the farthest point P_max and the nearest point P_min from the first measurement in the point set P, step 1046: calculate the second measurement plane formed by the point P_max and the measuring axis, and the third measurement plane formed by the point P_min and the measuring axis, step 1047: calculate the target angle between the second measurement plane and the third measurement plane, step 1048: calculate the full pitch vale according to the full pitch measurement formula, and take the distance from the point P_max to the first measurement plane as the blade height, step 1049: output full pitch vale and blade height. In this embodiment, full pitch vale and blade height can be calculated according to the steps in FIG. 3, that is: calculate the distance value of each blade point cloud from the measuring axis, and add the blade point cloud whose distance value satisfies a specific distance to a point set P; calculate point P_max farthest from the first measurement plane in the point set P; take the distance from the point P_max to the first measurement plane as the blade height, and calculate the full pitch of the propeller according to the full pitch measurement formula to determine whether the blade height and full pitch meet the requirements.

Wherein calculate the distance from a point to a line according to the following formula:

$$t = \frac{m*(x_0 - x_1) + n(y_0 - y_1) + p*(z_0 - z_1)}{(m*m + n*n + p*p)}$$

$$x_c = m*t + x_1$$

$$y_c = n*t + y_1$$

$$z_c = p*t + z_1$$

$$dp\_1 = \sqrt{[(x_0 - x_c)^2 (y_0 - y_c)^2 + (z_0 - z_c)^2]}$$

In this embodiment, calculate the blade height according to the following formula: Calculate the distance between the point farthest from the measurement plane in the point set P according to the distance from the point to the plane.

If it is necessary to detect the local pitch and flanging height, it can be detected in the following way. Specifically, calculate point P_min closest to the first measurement plane in the point set P; calculate a second measurement plane formed by the point P_max and the measuring axis, and calculate a third measurement plane formed by the point P_min and the measuring axis; calculate a target angle between the second measurement plane and the third measurement plane; segment the second measurement plane according to a local equal fraction n and the target angle to obtain n equal division planes; calculate a local pitch according to the point set P and each equal division plane.

Figure 4:
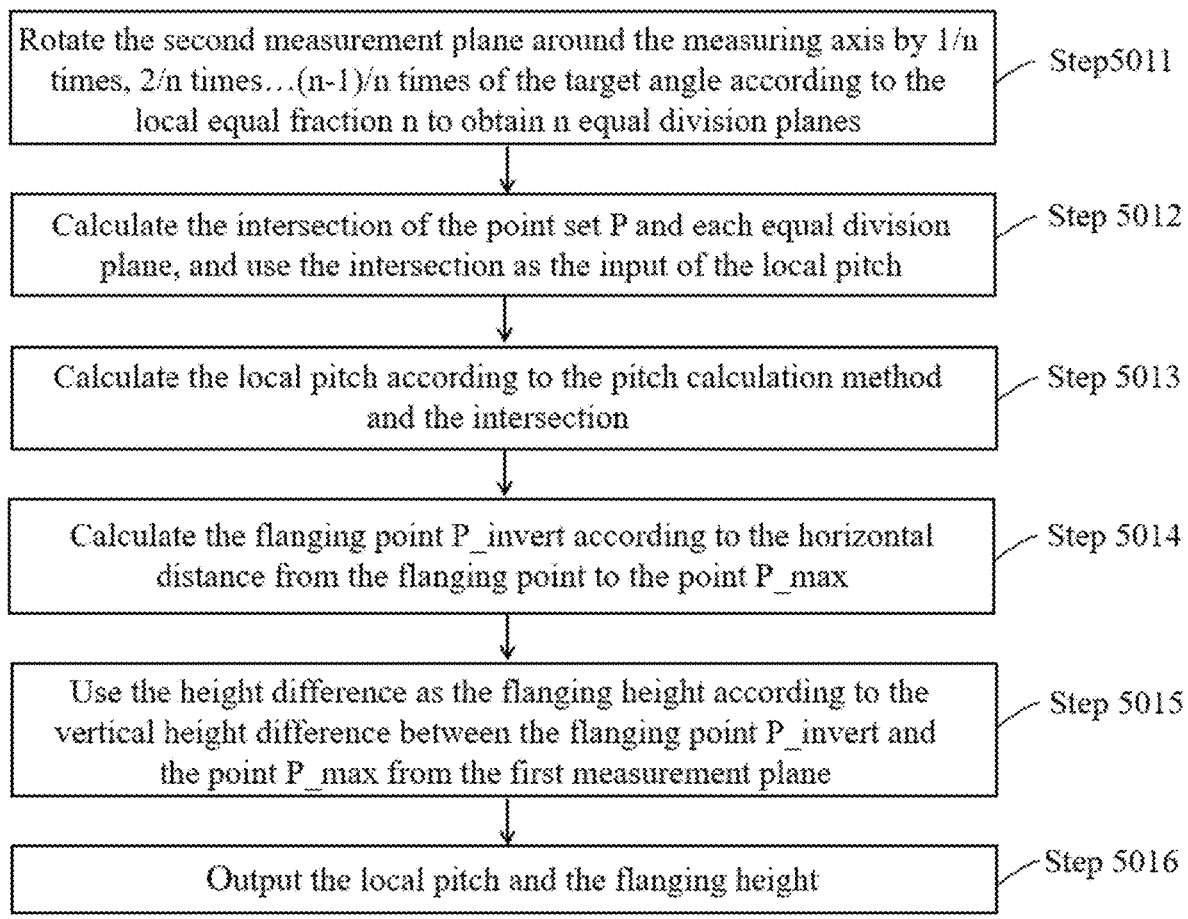
FIG. 4 is a schematic flow chart of another method for detecting propellers with high-precision provided by the embodiment of the present application.

Specially, in conjunction with FIG. 4, the special implementation includes:

Step 5011: rotate the second measurement plane around the measuring axis by 1/n times, 2/n times . . . (n−1)/n times of the target angle according to the local equal fraction n to obtain n equal division planes, step 5012: calculate the intersection of the point set P and each equal division plane, and use the intersection as the input of the local pitch, step 5013: calculate the local pitch according to the pitch calculation method and the intersection, step 5014: calculate the flanging point P_invert according to the horizontal distance from the flanging point to the point P_max, step 5015: use the height difference as the flanging height according to the vertical height difference between the flanging point P_invert and the point P_max from the first measurement plane, step 5016: output the local pitch and the flanging height.

In this embodiment, the equal division plane is obtained as follows: rotate the second measurement plane around the measuring axis by 1/n times, 2/n times . . . (n−1)/n times of the target angle according to the local equal fraction n to obtain n equal division planes.

Calculate the local pitch according to the point set P and each equal division plane, comprises: calculate the intersection of the point set P and each equal division plane, and use the intersection as the input of the local pitch, and calculate the local pitch according to the pitch calculation method and the intersection to determine whether the local pitch meets the requirements.

In this embodiment, the angle between two planes is obtained according to the following formula:

$$\theta = \arccos\left(\frac{|A_1A_2 + B_1B_2 + C_1C_2|}{\sqrt{(A_1^2 + B_1^2 + C_1^2)}\sqrt{A_2^2 + B_2^2 + C_2^2}}\right)$$

Based on the previous description, the method of calculating the local pitch is briefly explained again, as follows:

First step: Calculate the equal division plane after rotation, and determine the equal division angle according to the local equal fraction n: $\alpha_{local}=\alpha/n$, first let First, i=1. Choose three non-collinear points on Plane 1 (the first measurement plane), and translate the rotation axis to pass the origin, that is, translate the measuring axis and these three points according to the vector; Rotate the translated three points around the translated axis by an angle (using Eigen's axis angle model) $\alpha/n*i$, and calculate the rotated three-point coordinates; Move the measuring axis back again, that is, the measuring axis and the three rotated points are translated according to the vector (xc,yc,zc); According to the latest three-point coordinates, a new plane equation is calculated, which is the rotated equation; Update the value of i so that i+1, repeat the above steps until i=n;

Second step: Calculate the point closest to each equal division plane in the point set P (according to the point-to-plane distance), and obtain n+1 local equal division points.

Third step: Calculate the local pitch according to the formula of the local equal division point and the pitch.

In this embodiment, first find the flanging point P_invert, obtain a vertical height difference between the flanging point P_invert and the point P_max from the first measurement plane, and use the height difference as the flanging height to determine whether the flanging height meets the requirements.

That is, the flanging height can be calculated as follows:
First Step: Calculate the flanging point according to the flanging parameters given;
Second Step: According to the distance from the point to the plane, obtain the distances from the flanging point and p_max point to the measurement plane respectively, and the difference between the two distances is the flanging height;
The present application invented a simple and efficient propeller detection device, which filled the gap in this field and realized the propeller point cloud selection. After a long period of research and selection, an optimal device for this solution was selected.
In the embodiment of the present application, the point cloud of the propeller is collected by means of 3D vision, and the 3D point cloud is processed by an algorithm, so as to accurately measure the full pitch, local pitch, and flanging height of the propeller. In terms of the selection of acquisition vision sensors, the current mainstream 3D vision cameras include binocular cameras, laser line scan, structured light, TOF, etc. According to the characteristics of the propeller itself, this solution prefers to use a structured light camera or a laser line scan camera. The precision of the two cameras is relatively high, which can meet the precision requirements, and the collection efficiency is high, especially the structured light camera, which has a very high collection efficiency. And the point cloud is relatively clear with less noise.

Figure 5:
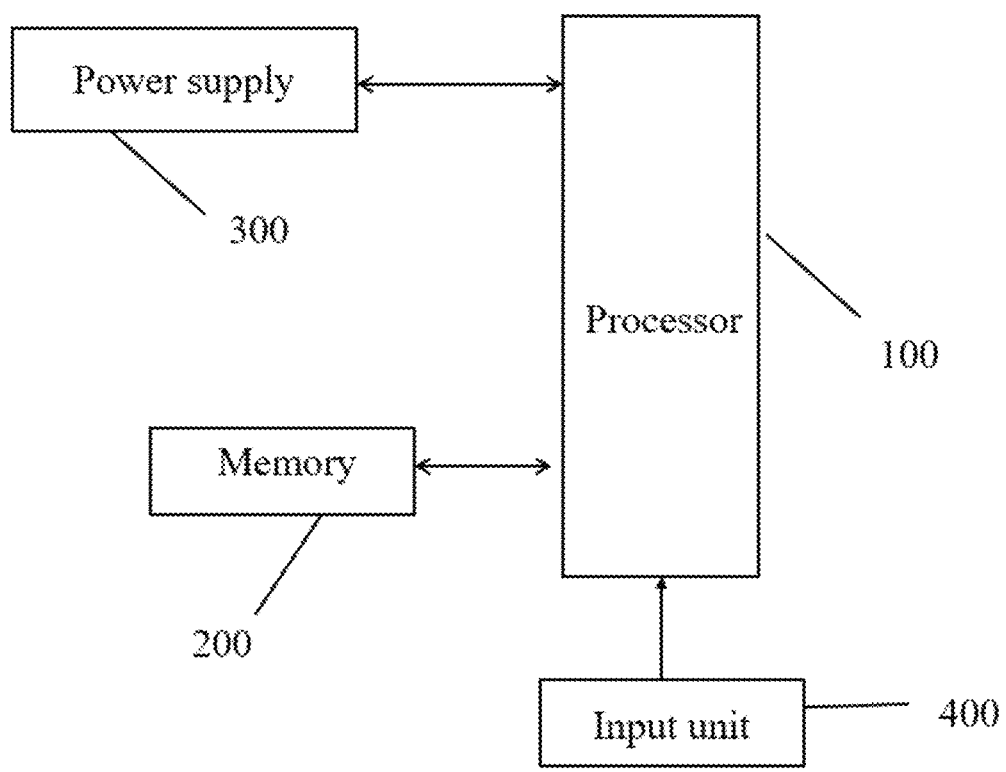
FIG. 5 is a schematic structural diagram of a device provided by an embodiment of the application.

As shown in FIG. 5, it shows a schematic structural diagram of the detection device involved in the embodiment of the present application, specifically:

The device may comprise a processor 100 with one or more processing cores, a memory 200 of one or more computer-readable storage media, a power supply 300, an input unit 400 and other components. Those skilled in the art can understand that the structure of the device shown in the figure does not constitute a limitation to the device, and may include more or less components than those shown in the figure, or combine some components, or arrange different components. Wherein:

The processor 100 is the control center of the device. It uses various interfaces and lines to connect various parts of the entire device. By running or executing software programs and/or modules stored in the memory 200, and calling data stored in the memory 200, the processor 100 executes various functions and processing data of the device, so as to monitor the device as a whole. Optionally, the processor 100 may comprise one or more processing cores; the processor 100 may be a Central Processing Unit (CPU), or other general-purpose processors, Digital Signal Processors (DSP), Application Specific Integrated Circuit (ASIC), Field-Programmable Gate Array (FPGA) or other programmable logic devices, discrete gate or transistor logic devices, discrete hardware components, etc. A general-purpose processor may be a microprocessor or the processor may be any conventional processor, etc. Preferably, the processor 100 can integrate an application processor and a modem processor, wherein the application processor mainly processes operating systems, user interfaces, and application programs, and the modem processor mainly processes wireless communications. It can be understood that the foregoing modem processor may not be integrated into the processor.

The memory 200 can be used to store software programs and modules, and the processor 100 executes various functional applications and data processing by running the software programs and modules stored in the memory 200. The memory 200 may mainly include a program storage area and a data storage area, wherein the program storage area may store an operating system, an application program required by at least one function (such as a sound playback function, an image playback function, etc.), etc. The data storage area can store data and the like created according to the use of the detection device. In addition, the memory 200 may include high-speed random access memory, and may also include non-volatile memory, such as at least one magnetic disk storage device, flash memory device, or other volatile solid-state storage devices. Correspondingly, the memory 200 may also include a memory controller to provide processor access to the memory 200.

The device also comprises a power supply 300 for supplying power to each component. Preferably, the power supply 300 can be logically connected to the processor 100 through the power management system, so that functions such as charging, discharging, and power consumption management can be realized through the power management system. The power supply 300 may also comprise one or more DC or AC power supplies, recharging systems, power failure detection circuits, power converters or inverters, power status indicators, and any other components.

The device can also comprise an input unit 400, which can be used to receive input numbers or character information, and generate keyboard, mouse, joystick, optical or trackball signal input related to user settings and function control.

Although not shown, the device may also comprise a display unit, etc., which will not be repeated here. Specifically, in this embodiment, the processor 100 in the device will load the executable file corresponding to the process of one or more application programs into the memory 200 according to the following instructions, and the processor 100 will run application program stored in the memory 200, so as to realize various functions, as follows: obtain a measurement point cloud of the propeller, and filter the measurement point cloud to obtain a target point cloud; process the target point cloud to obtain a first measurement plane, and find a center point of a pressure cone point cloud; obtain a measuring axis according to the first measurement plane and the center point; segment the target point cloud to obtain the blade point cloud of each blade, and analyze the blade point cloud and measuring axis to obtain parameters of the propeller, so as to determine whether the propeller is qualified.

Further, obtain the measurement point cloud of the propeller, and filter the measurement point cloud to obtain the target point cloud comprises:
  detect the propeller by means of a structured light 3D camera and obtain the measurement point cloud of the propeller;
  filter the measurement point cloud to remove stray point cloud in order to obtain the target point cloud.

Further, process the target point cloud to obtain the first measurement plane comprises:
  Step A: randomly select three non-collinear points from the target point cloud, and determine a plane through the three points;
  Step B: find inliers from the target point cloud, wherein take the points whose distance to the plane is less than a preset distance as inliers;
  Step C: update the three points selected in step A, re-determine a plane, and perform step B to obtain inliers of the updated plane;
  iteratively process the step C, after a preset number of iterations, select the plane with the most inliers as the first measurement plane.

Further, obtain the measuring axis according to the first measurement plane and the central point comprises:
  obtain a linear equation of the measuring axis according to the center point of the pressure cone point cloud and a normal vector of the first measurement plane;
  transform a symmetric linear equation of the measuring axis into an intersection linear equation of the measuring axis to obtain the measuring axis.

Further, segment the target point cloud to obtain the blade point cloud of each blade, and analyze the blade point cloud and measuring axis to obtain parameters of the propeller, so as to determine whether the propeller is qualified, comprises:
  segment the target point cloud to obtain the blade point cloud of each blade;

calculate the distance value of each blade point cloud from the measuring axis, and add the blade point cloud whose distance value satisfies a specific distance to a point set P;

calculate point P_max farthest from the first measurement plane in the point set P;

take the distance from the point P_max to the first measurement plane as the blade height, and calculate the full pitch of the propeller according to the full pitch measurement formula to determine whether the blade height and full pitch meet the requirements.

Further, segment the target point cloud to obtain the blade point cloud of each blade, and analyze the blade point cloud and measuring axis to obtain parameters of the propeller, so as to determine whether the propeller is qualified, further comprises:

calculate point P_min closest to the first measurement plane in the point set P;

calculate a second measurement plane formed by the point P_max and the measuring axis, and calculate a third measurement plane formed by the point P_min and the measuring axis;

calculate a target angle between the second measurement plane and the third measurement plane;

segment the second measurement plane according to a local equal fraction n and the target angle to obtain n equal division planes;

calculate a local pitch according to the point set P and each equal division plane.

Further, segment the second measurement plane according to a local equal fraction n and the target angle to obtain n equal division planes, comprises:

rotate the second measurement plane around the measuring axis by 1/n times, 2/n times ... (n−1)/n times of the target angle according to the local equal fraction n to obtain n equal division planes.

Further, calculate the local pitch according to the point set P and each equal division plane, comprises:

calculate the intersection of the point set P and each equal division plane, and use the intersection as the input of the local pitch, and calculate the local pitch according to the pitch calculation method and the intersection to determine whether the local pitch meets the requirements.

Further, segment the target point cloud to obtain the blade point cloud of each blade, and analyze the blade point cloud and measuring axis to obtain parameters of the propeller, so as to determine whether the propeller is qualified, further comprises:

find the flanging point P_invert, obtain a vertical height difference between the flanging point P_invert and the point P_max from the first measurement plane, and use the height difference as the flanging height to determine whether the flanging height meets the requirements.

Those of ordinary skill in the art can understand that all or part of the steps in the various methods of the above embodiments can be completed by instructions, or by instructions controlling related hardware, and the instructions can be stored in a computer-readable storage medium, and is loaded and executed by the processor.

To this end, an embodiment of the present application provides a computer-readable storage medium, which may include: Read Only Memory (ROM), Random Access Memory (RAM), a magnetic disk or an optical disk, etc. A computer program is stored thereon, and the computer program is loaded by the processor to execute the steps in any one of the method for detecting propellers with high-precision provided in the embodiments of the present application. For example, when a computer program is loaded by a processor, the following steps may be performed:

obtain a measurement point cloud of the propeller, and filter the measurement point cloud to obtain a target point cloud;

process the target point cloud to obtain a first measurement plane, and find a center point of a pressure cone point cloud;

obtain a measuring axis according to the first measurement plane and the center point;

segment the target point cloud to obtain the blade point cloud of each blade, and analyze the blade point cloud and measuring axis to obtain parameters of the propeller, so as to determine whether the propeller is qualified.

Further, obtain the measurement point cloud of the propeller, and filter the measurement point cloud to obtain the target point cloud comprises:

detect the propeller by means of a structured light 3D camera and obtain the measurement point cloud of the propeller;

filter the measurement point cloud to remove stray point cloud in order to obtain the target point cloud.

Further, process the target point cloud to obtain the first measurement plane comprises:

Step A: randomly select three non-collinear points from the target point cloud, and determine a plane through the three points;

Step B: find inliers from the target point cloud, wherein take the points whose distance to the plane is less than a preset distance as inliers;

Step C: update the three points selected in step A, re-determine a plane, and perform step B to obtain inliers of the updated plane;

iteratively process the step C, after a preset number of iterations, select the plane with the most inliers as the first measurement plane.

Further, obtain the measuring axis according to the first measurement plane and the central point comprises:

obtain a linear equation of the measuring axis according to the center point of the pressure cone point cloud and a normal vector of the first measurement plane;

transform a symmetric linear equation of the measuring axis into an intersection linear equation of the measuring axis to obtain the measuring axis.

Further, segment the target point cloud to obtain the blade point cloud of each blade, and analyze the blade point cloud and measuring axis to obtain parameters of the propeller, so as to determine whether the propeller is qualified, comprises:

segment the target point cloud to obtain the blade point cloud of each blade;

calculate the distance value of each blade point cloud from the measuring axis, and add the blade point cloud whose distance value satisfies a specific distance to a point set P;

calculate point P_max farthest from the first measurement plane in the point set P;

take the distance from the point P_max to the first measurement plane as the blade height, and calculate the full pitch of the propeller according to the full pitch measurement formula to determine whether the blade height and full pitch meet the requirements.

Further, segment the target point cloud to obtain the blade point cloud of each blade, and analyze the blade point cloud and measuring axis to obtain parameters of the propeller, so as to determine whether the propeller is qualified, further comprises:

calculate point P_min closest to the first measurement plane in the point set P;

calculate a second measurement plane formed by the point P_max and the measuring axis, and calculate a third measurement plane formed by the point P_min and the measuring axis;

calculate a target angle between the second measurement plane and the third measurement plane;

segment the second measurement plane according to a local equal fraction n and the target angle to obtain n equal division planes;

calculate a local pitch according to the point set P and each equal division plane.

Further, segment the second measurement plane according to a local equal fraction n and the target angle to obtain n equal division planes, comprises:

rotate the second measurement plane around the measuring axis by 1/n times, 2/n times . . . (n−1)/n times of the target angle according to the local equal fraction n to obtain n equal division planes.

Further, calculate the local pitch according to the point set P and each equal division plane, comprises:

calculate the intersection of the point set P and each equal division plane, and use the intersection as the input of the local pitch, and calculate the local pitch according to the pitch calculation method and the intersection to determine whether the local pitch meets the requirements.

Further, segment the target point cloud to obtain the blade point cloud of each blade, and analyze the blade point cloud and measuring axis to obtain parameters of the propeller, so as to determine whether the propeller is qualified, further comprises:

find the flanging point P_invert, obtain a vertical height difference between the flanging point P_invert and the point P_max from the first measurement plane, and use the height difference as the flanging height to determine whether the flanging height meets the requirements.

In the above-mentioned embodiments, the descriptions of each embodiment have their own emphases. For the part that is not described in detail in a certain embodiment, refer to the detailed description of other embodiments above, and will not be repeated here.

During specific implementation, each of the above units or structures can be implemented as an independent entity, or can be combined arbitrarily as the same or several entities. For the specific implementation of the above units or structures, reference may be made to the foregoing method embodiments, and details are not repeated here.

For the specific implementation of the above operations, reference may be made to the foregoing embodiments, and details are not repeated here.

The above is only the implementation of the present application, and does not limit the protection scope of the present application. Any equivalent structure or equivalent process conversion made by using the specification and drawings of the present application, or directly or indirectly used in other related technologies fields, are all included in the protection scope of the present application in the same way.

What is claimed is:

1. A method for detecting propellers with high-precision, comprising:

obtain a measurement point cloud of the propeller, and filter the measurement point cloud to obtain a target point cloud;

process the target point cloud to obtain a first measurement plane, and find a center point of a pressure cone point cloud;

obtain a measuring axis according to the first measurement plane and the center point;

segment the target point cloud to obtain the blade point cloud of each blade, and analyze the blade point cloud and measuring axis to obtain parameters of the propeller, so as to determine whether the propeller is qualified.

2. The method according to claim 1, wherein obtain the measurement point cloud of the propeller, and filter the measurement point cloud to obtain the target point cloud comprises:

detect the propeller by means of a structured light 3D camera and obtain the measurement point cloud of the propeller;

filter the measurement point cloud to remove stray point cloud in order to obtain the target point cloud.

3. The method according to claim 1, wherein process the target point cloud to obtain the first measurement plane comprises:

Step A: randomly select three non-collinear points from the target point cloud, and determine a plane through the three points;

Step B: find inliers from the target point cloud, wherein take the points whose distance to the plane is less than a preset distance as inliers;

Step C: update the three points selected in step A, re-determine a plane, and perform step B to obtain inliers of the updated plane;

iteratively process the step C, after a preset number of iterations, select the plane with the most inliers as the first measurement plane.

4. The method according to claim 1, wherein obtain the measuring axis according to the first measurement plane and the central point comprises:

obtain a linear equation of the measuring axis according to the center point of the pressure cone point cloud and a normal vector of the first measurement plane;

transform a symmetric linear equation of the measuring axis into an intersection linear equation of the measuring axis to obtain the measuring axis.

5. The method according to claim 1, wherein segment the target point cloud to obtain the blade point cloud of each blade, and analyze the blade point cloud and measuring axis to obtain parameters of the propeller, so as to determine whether the propeller is qualified, comprises:

segment the target point cloud to obtain the blade point cloud of each blade;

calculate the distance value of each blade point cloud from the measuring axis, and add the blade point cloud whose distance value satisfies a specific distance to a point set p;

calculate point P_max farthest from the first measurement plane in the point set P;

take the distance from the point P_max to the first measurement plane as the blade height, and calculate the full pitch of the propeller according to the full pitch measurement formula to determine whether the blade height and full pitch meet the requirements.

6. The method according to claim 5, wherein segment the target point cloud to obtain the blade point cloud of each blade, and analyze the blade point cloud and measuring axis to obtain parameters of the propeller, so as to determine whether the propeller is qualified, further comprises:

calculate point P_min closest to the first measurement plane in the point set P;

calculate a second measurement plane formed by the point P_max and the measuring axis, and calculate a third measurement plane formed by the point P_min and the measuring axis;

calculate a target angle between the second measurement plane and the third measurement plane;

segment the second measurement plane according to a local equal fraction n and the target angle to obtain n equal division planes;

calculate a local pitch according to the point set P and each equal division plane.

7. The method according to claim 6, wherein segment the second measurement plane according to a local equal fraction n and the target angle to obtain n equal division planes, comprises:

rotate the second measurement plane around the measuring axis by 1/n times, 2/n times . . . (n−1)/n times of the target angle according to the local equal fraction n to obtain n equal division planes.

8. The method according to claim 6, wherein calculate the local pitch according to the point set P and each equal division plane, comprises:

calculate the intersection of the point set P and each equal division plane, and use the intersection as the input of the local pitch, and calculate the local pitch according to the pitch calculation method and the intersection to determine whether the local pitch meets the requirements.

9. The method according to claim 6, wherein segment the target point cloud to obtain the blade point cloud of each blade, and analyze the blade point cloud and measuring axis to obtain parameters of the propeller, so as to determine whether the propeller is qualified, further comprises:

find the flanging point P_invert, obtain a vertical height difference between the flanging point P_invert and the point P_max from the first measurement plane, and use the height difference as the flanging height to determine whether the flanging height meets the requirements.

10. A device for detection with high-precision, comprising:

one or more processors;

memory; and one or more application programs, wherein the one or more application programs are stored in the memory and configured to be executed by the processor to implement the method according to claim 1.

\* \* \* \* \*